(12) United States Patent
Park et al.

(10) Patent No.: US 11,613,613 B2
(45) Date of Patent: Mar. 28, 2023

(54) SUPERABSORBENT POLYMER COMPOSITION AND METHOD FOR PREPARING THE SAME

(71) Applicant: LG Chem, Ltd., Seoul (KR)

(72) Inventors: Bohee Park, Daejeon (KR); Dae Woo Nam, Daejeon (KR); Young Jae Hur, Daejeon (KR); Yeon Woo Hong, Daejeon (KR); Jiyoon Jeong, Daejeon (KR)

(73) Assignee: LG Chem, Ltd.

( * ) Notice: Subject to any disclaimer, the term of this patent is extended or adjusted under 35 U.S.C. 154(b) by 281 days.

(21) Appl. No.: 16/770,414

(22) PCT Filed: Nov. 29, 2018

(86) PCT No.: PCT/KR2018/014974
§ 371 (c)(1),
(2) Date: Jun. 5, 2020

(87) PCT Pub. No.: WO2019/117513
PCT Pub. Date: Jun. 20, 2019

(65) Prior Publication Data
US 2020/0308352 A1    Oct. 1, 2020

(30) Foreign Application Priority Data

Dec. 11, 2017  (KR) .......................... 10-2017-0169497
Nov. 27, 2018  (KR) .......................... 10-2018-0148842

(51) Int. Cl.
| | | |
|---|---|---|
| C08F 20/06 | (2006.01) | |
| C08L 33/02 | (2006.01) | |
| C08J 3/24  | (2006.01) | |
| C08L 71/02 | (2006.01) | |
| C08K 3/011 | (2018.01) | |
| C08K 5/00  | (2006.01) | |

(52) U.S. Cl.
CPC ............... *C08J 3/245* (2013.01); *C08L 71/02* (2013.01); *C08F 20/06* (2013.01); *C08J 2333/08* (2013.01); *C08K 3/011* (2018.01); *C08K 5/0025* (2013.01); *C08L 33/02* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 5,112,902 | A | 5/1992 | Moriya et al. |
| 7,473,739 | B2 | 1/2009 | Dairoku et al. |
| 7,582,705 | B2 | 9/2009 | Dairoku et al. |
| 2005/0209352 | A1 | 9/2005 | Dairoku et al. |
| 2010/0072421 | A1 | 3/2010 | Kitano et al. |
| 2010/0184594 | A1 | 7/2010 | Riegel et al. |
| 2015/0099624 | A1 | 4/2015 | Lee et al. |
| 2015/0273433 | A1 | 10/2015 | Nakatsuru et al. |
| 2015/0360204 | A1 | 12/2015 | Tachi et al. |
| 2016/0208035 | A1 | 7/2016 | Ryu et al. |
| 2016/0354757 | A1 | 12/2016 | Lee et al. |
| 2017/0114192 | A1 | 4/2017 | Kim et al. |
| 2017/0173563 | A1 | 6/2017 | Kim et al. |
| 2018/0037686 | A1 | 2/2018 | Lee et al. |
| 2018/0178193 | A1 | 6/2018 | Lee et al. |
| 2018/0244857 | A1 | 8/2018 | Lee et al. |
| 2018/0265646 | A1 | 9/2018 | Nam et al. |
| 2021/0009725 | A1 | 1/2021 | Nam et al. |
| 2021/0113989 | A1 | 4/2021 | Hur et al. |

FOREIGN PATENT DOCUMENTS

| | | |
|---|---|---|
| EP | 2484439 A1 | 8/2012 |
| EP | 2905072 A1 | 8/2015 |
| EP | 3235856 A1 | 10/2017 |
| EP | 3249002 A1 | 11/2017 |
| EP | 3705510 A1 | 9/2020 |
| EP | 3757153 A1 | 12/2020 |
| JP | H0639485 B2 | 5/1994 |
| JP | H08157531 A | 6/1996 |
| JP | H08157606 A | 6/1996 |
| JP | 2008526502 A | 7/2008 |
| JP | 2009035657 A | 2/2009 |
| JP | 2010534752 A | 11/2010 |
| JP | 5558096 B2 | 7/2014 |
| KR | 920000785 B1 | 1/1992 |
| KR | 100858387 B1 | 9/2008 |
| KR | 20150067218 A | 6/2015 |
| KR | 20150132817 A | 11/2015 |
| KR | 20160063956 A | 6/2016 |
| KR | 20160074205 A | 6/2016 |
| KR | 20160145424 A | 12/2016 |
| KR | 20170020113 A | 2/2017 |
| KR | 20170106799 A | 9/2017 |

(Continued)

OTHER PUBLICATIONS

Schwalm, Reinhold, "UV Coatings: Basics, Recent Developments and New Applications." Elsevier Science, Dec. 21, 2006, p. 115.
Odian, George, "Principles of Polymerization." Second Edition, 1981, John Wiley & Sons, Inc., p. 203.

(Continued)

*Primary Examiner* — Richard A Huhn

(74) *Attorney, Agent, or Firm* — Lerner, David, Littenberg, Krumholz & Mentlik, LLP

(57) ABSTRACT

The present invention relates to superabsorbent polymer and a method for preparing the same. The present invention can provide a superabsorbent polymer in which a hydrophobic material having an HLB of 0-6, a hydrophilic polymer and a surface cross-linking agent are mixed into a base resin, thereby having improved rewetting characteristics and permeability through surface-modification of the base resin.

18 Claims, No Drawings

(56) References Cited

FOREIGN PATENT DOCUMENTS

| WO | 2006078046 A2 | 7/2006 | | |
|---|---|---|---|---|
| WO | WO-2006078046 A2 * | 7/2006 | ................ | C08J 3/12 |
| WO | 2014054731 A1 | 4/2014 | | |
| WO | 2014119553 A1 | 8/2014 | | |

OTHER PUBLICATIONS

Third Party Observation for PCT/KR2018/014974 dated Mar. 10, 2020; 16 pages.
International Search Report for PCT/KR2018/014974 dated Mar. 11, 2019; 5 pages.

* cited by examiner

SUPERABSORBENT POLYMER COMPOSITION AND METHOD FOR PREPARING THE SAME

CROSS-REFERENCE TO RELATED APPLICATIONS

The present application is a national phase entry under 35 U.S.C. § 371 of International Application No. PCT/KR2018/014974, filed Nov. 29, 2018, which claims priority to Korean Patent Application No. 10-2017-0169497 filed on Dec. 11, 2017 and Korean Patent Application No. 10-2018-0148842 filed on Nov. 27, 2018, the disclosures of which are herein incorporated by reference in their entirety.

BACKGROUND OF THE INVENTION

(a) Field of the Invention

The present invention relates to superabsorbent polymer and a method for preparing the same. More specifically, the present invention relates to superabsorbent polymer having improved rewet property and permeability, and a method for preparing the same.

(b) Description of the Related Art

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as a disposable diaper and the like, water-holding material for soil, water stop material for civil engineering and architecture, sheets for raising seedling, freshness preservatives in the field of food circulation, fomentation material, and the like.

In most cases, such superabsorbent polymer is being widely used in the field of hygienic goods such as a diaper or sanitary pad, etc., and for such use, it is required to exhibit high absorption power to moisture, and the like, and the absorbed moisture should not escape even under external pressure, and besides, it should properly maintain the shape even when it absorbs water and the volume is expanded (swollen), thus exhibiting excellent permeability.

However, it is known that centrifuge retention capacity (CRC) indicating the basic absorption power and water retention power of superabsorbent polymer, and absorption under load (AUL) indicating the property of retaining absorbed moisture despite the external pressure are difficult to be simultaneously improved. In case the whole crosslinking density of superabsorbent polymer is controlled low, centrifuge retention capacity may become relatively high, but the crosslink structure may become loose, and gel strength may decrease, thus deteriorating absorption under pressure. To the contrary, in case the crosslinking density is controlled high to improve absorption under pressure, it may become difficult to absorb moisture between the dense crosslink structures, thus deteriorating centrifuge retention capacity. For these reasons, there is a limit in providing superabsorbent polymer having simultaneously improved centrifuge retention capacity and absorption under pressure.

However, with the recent thinning of hygienic goods such as diapers and sanitary pads, superabsorbent polymer is required to have higher absorption performances. Among them, it is an important problem to simultaneously improve the conflicting properties of centrifuge retention capacity and absorption under pressure, and improve permeability, and the like.

And, to the hygienic goods such as diapers or sanitary pads, and the like, pressure may be applied by the weight of a user. Particularly, if superabsorbent polymer applied for a diaper or a sanitary pad absorbs liquid, and then, a pressure is applied by the weight of a user, rewet phenomenon wherein a part of the liquid absorbed in the superabsorbent polymer exudes again, and urine leakage may be generated.

Thus, many attempts are being made to inhibit such a rewet phenomenon. However, a specific method of effectively inhibiting rewet phenomenon has not been suggested yet.

SUMMARY OF THE INVENTION

In order to solve the problem of the prior art, it is an object of the present invention to provide superabsorbent polymer in which rewet and urine leakage are inhibited, and a method for preparing the same.

In order to achieve the objects, one aspect of the present invention provides a method for preparing superabsorbent polymer comprising the steps of:

preparing base resin in which acrylic acid-based monomers having acid groups, of which at least a part are neutralized, and an internal crosslinking agent are crosslinked (step 1);

mixing hydrophobic material having HLB of 0 or more and 6 or less, hydrophilic polymer, and a surface crosslinking agent with the base resin (step 2); and increasing the temperature of the mixture of step 2 to conduct surface modification of the base resin (step 3).

And, another aspect of the present invention provides superabsorbent polymer comprising:

base resin comprising crosslinked polymer in which acrylic acid-based monomers having acid groups, of which at least a part are neutralized, are crosslinked; and a surface modification layer formed on the surface of the base resin particles, in which the crosslinked polymer is additionally crosslinked by a surface crosslinking agent, wherein the surface modification layer comprises hydrophobic material having HLB of 0 or more and 6 or less, and hydrophilic polymer, and permeability (unit: seconds) measured according to the following Equation 1 is 30 seconds or less:

$$\text{Permeability (sec)} = T1 - B \qquad \text{[Equation 1]}$$

in the Equation 1,

T1 is a time taken until the height of a liquid level decreases from 40 ml to 20 ml, after putting 0.2±0.0005 g of a sieved (30#~50#) superabsorbent polymer sample in a chromatography column and adding brine to the volume of 50 ml, and then, leaving it for 30 minutes; and B is a time taken until the height of a liquid level decreases from 40 ml to 20 ml in a chromatography column filled with brine.

According to the superabsorbent polymer and the preparation method of the present invention, superabsorbent polymer exhibiting excellent absorption properties and permeability, in which rewet and urine leakage are inhibited, can be provided.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a method for preparing superabsorbent polymer composition according to specific embodiments of the present invention will be explained in more detail.

The method for preparing superabsorbent polymer according to one embodiment of the present invention comprises the steps of:

preparing base resin in which acrylic acid-based monomers having acid groups, of which at least a part are neutralized, and an internal crosslinking agent are cross-linked (step 1);

mixing hydrophobic material having HLB of 0 or more and 6 or less, hydrophilic polymer, and a surface crosslinking agent with the base resin (step 2); and increasing the temperature of the mixture of step 2 to conduct surface modification of the base resin (step 3).

Throughout the specification, "base resin" or "base resin powder" means polymer of water soluble ethylenically unsaturated monomers, made in the form of particles or powder by drying and grinding, and which is not subjected to a surface modification or surface crosslinking step described below.

The hydrogel polymer obtained by the polymerization reaction of acrylic acid-based monomers may be subjected to the processes of drying, grinding, sieving, surface crosslinking, and the like, and commercialized as a powder superabsorbent polymer product.

Recently, how long surface dryness can be maintained while diapers are practically used, as well as absorption properties of superabsorbent polymer such as centrifuge retention capacity, permeability, and the like, is becoming an important measure for estimating the properties of diapers.

It was confirmed that the superabsorbent polymer obtained by the preparation method of one embodiment has excellent centrifuge retention capacity, absorption under pressure, permeability, and the like, thus exhibiting excellent absorption performance, maintains dryness even after swollen by brine, and can effectively prevent rewet and urine leakage.

In the preparation method of superabsorbent polymer of the present invention, the raw material of the superabsorbent polymer, namely, the monomer composition comprising acrylic acid-based monomers having acid groups, of which at least a part are neutralized, an internal crosslinking agent, and a polymerization initiator is polymerized to obtain hydrogel polymer, and dried, ground and sieved to prepare base resin (step 1).

Hereinafter, it will be explained in more detail.

The monomer composition, which is the raw material of the superabsorbent polymer, comprises acrylic acid-based monomers having acid groups, of which at least a part are neutralized, and a polymerization initiator.

The acrylic acid-based monomer is a compound represented by the following Chemical Formula 1:

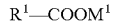  [Chemical Formula 1]

In the Chemical Formula 1, $R^1$ is a C2-5 alkyl group comprising an unsaturated bond, $M^1$ is a hydrogen atom, a monovalent or divalent metal, an ammonium group or an organic amine salt.

Preferably, the acrylic acid-based monomers may be one or more selected from the group consisting of acrylic acid, methacrylic acid, and monovalent metal salts, divalent metal salt, ammonium salts and organic amine salts of these acids.

Here, the acrylic acid-based monomers may have acid groups, and at least a part of the acid groups may be neutralized. Preferably, monomers that are partially neutralized with alkali substance such as sodium hydroxide, potassium hydroxide, ammonium hydroxide, etc. may be used. Here, the neutralization degree of the acrylic acid-based monomers may be 40 to 95 mol %, or 40 to 90 mol %, or 45 to 85 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption power of the polymer may be significantly lowered, and the polymer may exhibit rubber-like property, which is difficult to handle.

The concentration of the acrylic acid-based monomers may be about 20 to about 60 wt %, preferably about 40 to about 50 wt %, based on the monomer composition comprising the raw materials of superabsorbent polymer and solvents, and it may be controlled to an appropriate concentration considering a polymerization time and reaction conditions, and the like. However, if the concentration of the monomers becomes too low, the yield of superabsorbent polymer may decrease and economic efficiency may be lowered, and if it becomes too high, process problems may be generated such as precipitation of a part of the monomers or low grinding efficiency during grinding of the polymerized hydrogel polymer, and the properties of superabsorbent polymer may be deteriorated.

A polymerization initiator that is used in the preparation method of superabsorbent polymer is not specifically limited as long as it is commonly used for the preparation of superabsorbent polymer.

Specifically, as the polymerization initiator, a thermal polymerization initiator or a photopolymerization initiator by UV irradiation may be used according to a polymerization method. However, even in the case of photopolymerization, since a certain amount of heat is generated by UV irradiation, etc., and heat is generated to some degree according to the progression of an exothermic polymerization reaction, a thermal polymerization initiator may be additionally included.

The photopolymerization initiator is not limited in terms of its construction, as long as it is a compound capable of forming a radical by light such as UV.

As the photopolymerization initiator, one or more selected from the group consisting of benzoin ether, dialkyl acetophenone, hydroxyl alkylketone, phenyl glyoxylate, benzyl dimethyl Ketal, acyl phosphine, and α-aminoketone may be used. Among them, as the acyl phosphine, commercially available lucirin TPO, i.e., 2,4,6-trimethyl-benzoyl-trimethyl phosphine oxide may be used. More various photopolymerization initiators are described in Reinhold Schwalm's book, "UV Coatings: Basics, Recent Developments and New Application (Elsevier 2007)", page 115, and are not limited to the above described examples.

The photopolymerization initiator may be included in the concentration of about 0.01 to about 1.0 wt %, based on the monomer composition. If the concentration of the photopolymerization initiator is too low, polymerization speed may become slow, and if it is too high, the molecular weight of superabsorbent polymer may be small and the properties may become irregular.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4$)$_2S_2O_8$), etc., and, specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl)propane]dihydrochloride, 4,4-azobis-(4-cyanovalericacid), etc. More various thermal initiators are described in "Principle of Polymerization (Wiley, 1981)", Odian's book, page 203, and are not limited to the above described examples.

According to one embodiment of the invention, the monomer composition may further comprise an internal crosslinking agent as the raw material of superabsorbent polymer. As the internal crosslinking agent, a crosslinking agent having one or more functional groups capable of reacting with the acrylic acid-based monomers, and having one or more ethylenically unsaturated groups; or a crosslinking agent having two or more functional groups capable of reacting with the substituents of the acrylic acid-based monomers and/or the substituents formed by the hydrolysis of the monomers may be used.

Specific examples of the internal crosslinking agent may include one or more selected from the group consisting of N,N'-methylenebisacrylamide, trimethylolpropane tri(meth)acrylate, ethyleneglycol di(meth)acrylate, polyethyleneglycol (meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propylene glycol, glycerin, and ethylene carbonate.

Such an internal crosslinking agent may be included in the concentration of about 0.01 to about 2.0 wt % based on the monomer composition, to crosslink polymerized polymer.

In the preparation method, the monomer composition may further comprise additives such as a thickener, a plasticizer, a preservation stabilizer, an antioxidant, etc., as necessary.

The above explained raw materials such as acrylic acid-based monomers having acid groups, of which at least part are neutralized, a photopolymerization initiator, a thermal polymerization initiator, an internal crosslinking agent, and additives may be prepared in the form of a solution dissolved in a solvent.

Here, the solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount except the above described components, based on the total content of the monomer composition.

Meanwhile, a method of forming hydrogel polymer by the thermal polymerization or photopolymerization of the monomer composition is not specifically limited in terms of its construction, as long as it is a commonly used polymerization method.

Specifically, the polymerization method is largely classified into thermal polymerization and photopolymerization according to an energy source. Commonly, thermal polymerization may be progressed in a reactor equipped with a stirring axis such as a kneader, and, photopolymerization may be progressed in a reactor equipped with a movable conveyer belt, but the above explained polymerization methods are no more than examples, and the present invention is not limited thereto.

For example, hydrogel polymer may be obtained by introducing the above described monomer composition into a reactor equipped with a stirring axis such as a kneader, and supplying hot air or heating the reactor to progress thermal polymerization. Here, the hydrogel polymer discharged to the outlet of the reactor may in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with a (weight average) particle diameter of 2 to 50 mm may be obtained.

And, in case photopolymerization of the monomer composition is progressed in a reactor equipped with a movable conveyer belt as explained above, hydrogel polymer in the form of a sheet having a width of the belt may be obtained. Here, the thickness of the sheet may vary according to the concentration of the introduced monomer composition and the introduction speed, but it is preferable that the monomer composition is fed so as to obtain polymer in the form of sheet having a thickness of about 0.5 to about 5 cm. If a monomer composition is fed so that the thickness of sheet polymer may become too thin, production efficiency may be low, and if the thickness of sheet polymer is greater than 5 cm, due to the excessively thick thickness, polymerization may not uniformly occur over the whole thickness.

Here, the moisture content of hydrogel polymer obtained by such a method may be about 40 to about 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. At this time, the drying condition is set up such that the temperature is raised from room temperature to about 180° C. and then maintained at 180° C., and the total drying time is 20 minutes including a temperature raising step of 5 minutes.

Next, the obtained hydrogel polymer is dried.

Wherein, a coarse grinding step may be further conducted before drying the hydrogel polymer so as to increase drying efficiency.

Here, grinders that can be used in the coarse grinding is not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but the grinder is not limited thereto.

Through the coarse grinding step, the particle diameter of the hydrogel polymer may be controlled to about 2 to about 10 mm.

Grinding to a particle diameter less than 2 mm would not be technically easy due to the high moisture content of hydrogel polymer, and cause agglomeration between ground particles. Meanwhile, if grinding to a particle diameter greater than 10 mm, the effect for increasing the efficiency in the subsequent drying step may be insignificant.

The hydrogel polymer coarsely ground as explained above, or hydrogel polymer immediately after polymerization that is not subjected to the coarse grinding step is dried. Here, the drying temperature may be about 150 to about 250° C. If the drying temperature is less than 150° C., a drying time may become excessively long, and the properties of the finally formed superabsorbent polymer may be deteriorated, and if the drying temperature is greater than 250° C., only the surface of polymer may be dried to generate fine powders in the subsequent grinding process, and the properties of the finally formed superabsorbent polymer may be deteriorated. Thus, it is preferable that the drying is progressed at a temperature of about 150 to about 200° C., more preferably about 160 to about 180° C.

Meanwhile, a drying time may be about 20 to about 90 minutes, considering process efficiency, and the like, but is not limited thereto.

And, the drying method is not limited in terms of the construction as long as it is commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 0.1 to about 10 wt %.

Next, the dried polymer obtained through the drying step is ground.

The particle diameter of the polymer powder obtained after the grinding step may be 150 μm to 850 μm. As a grinder for grinding to such a particle diameter, specifically, a pin mill, a hammer mill, a screw mill, a roll mill, a disc mill, or a jog mill, etc. may be used, but the grinder is not limited thereto.

And, in order to manage the properties of the superabsorbent polymer powders finally productized after the grinding step, the polymer powders obtained after grinding may be subjected to a separate process of sieving according to the particle diameter.

Next, hydrophobic material having HLB of 0 or more and 6 or less, hydrophilic polymer, and a surface crosslinking agent are mixed with the base resin (step 2).

In a common preparation method of superabsorbent polymer, dried and ground polymer, namely, base resin is mixed with a surface crosslinking solution comprising a surface crosslinking agent, and then, the mixture is heated to raise the temperature, thereby conducting a surface crosslinking reaction of the ground polymer.

The surface crosslinking step is a step of inducing a crosslinking reaction on the surface of ground polymer in the presence of a surface crosslinking agent, thereby forming superabsorbent polymer having more improved properties. Through the surface crosslinking, a surface crosslink layer (surface modification layer) is formed on the surface of ground polymer particles.

In general, since a surface crosslinking agent is coated on the surface of superabsorbent polymer particles, a surface crosslinking reaction occurs on the surface of superabsorbent polymer particles, and it improves crosslinkability on the surface of the particles without substantially influencing the inside of the particles. Thus, surface crosslinked superabsorbent polymer particles have higher crosslinking degree around the surface than inside.

However, although absorption under pressure and permeability may be improved by the surface crosslinking reaction, rewet property may be deteriorated.

Meanwhile, according to the preparation method of the present invention rewet property and permeability can be simultaneously improved by mixing hydrophobic material and hydrophilic polymer with base resin, before mixing a surface crosslinking agent with the base resin to conduct a surface crosslinking reaction.

As the hydrophobic material, materials fulfilling the lower limit of HLB of 0 or more, or 1 or more, or 2 or more, and the upper limit of 6 or less, or 5 or less, or 5.5 or less may be used. And, since the hydrophobic material should be dissolved during the surface crosslinking reaction and positioned in the surface modification layer of the base resin, materials of which melting point is below the surface crosslinking reaction temperature may be used.

Examples of hydrophobic materials that can be used may include glyceryl stearate, glycol stearate, magnesium stearate, glyceryl laurate, sorbitan stearate, sorbitan trioleate, and PEG-4 dilaurate, and the like, and preferably, glyceryl stearate, or glyceryl laurate may be used, but the present invention is not limited thereto.

The hydrophobic material is distributed in the surface modification layer of the surface of the base resin, and it may prevent the aggregation or agglomeration of swollen polymer particles by increased pressure, while the superabsorbent polymer absorbs liquid and is swollen, and may afford hydrophobicity to the surface, thereby facilitating the penetration and diffusion of liquid. Thus, it may contribute to improvement in the rewet property of superabsorbent polymer. And, since the hydrophobic material is coated on the surface, it makes difficult for liquid absorbed inside to move outside the swollen polymer. Thus, it may contribute to improvement in the rewet property of superabsorbent polymer.

Meanwhile, although the rewet property of superabsorbent polymer can be improved by the introduction of such hydrophobic material, wetting may be deteriorated as the hydrophobicity of the surface increases. Thus, in case an excessive amount of liquid is introduced in an instant, leakage may be generated.

Meanwhile, according to the preparation method of the present invention, hydrophilic polymer is introduced together with the hydrophobic material in the base resin. The hydrophilic polymer performs a function for improving wetting of superabsorbent polymer, thereby improving rewet property and preventing urine leakage in a diaper.

The hydrophobic material may be mixed in the amount of about 0.02 parts by weight or more, or about 0.025 parts by weight or more, or about 0.05 parts by weight or more, and about 0.5 parts by weight or less, or about 0.3 parts by weight or less, or about 0.1 parts by weight or less, based on 100 parts by weight of the base resin. If the content of the hydrophobic material is less than 0.02 parts by weight, it may not be sufficient for improving rewet property, and if the hydrophobic material is excessively included exceeding 0.5 parts by weight, base resin and hydrophobic material may be separated from each other, and thus, rewet property improvement effect may not be obtained or the hydrophobic material may act as impurities. Thus, the above range is preferable.

The hydrophilic polymer is a polymer compound that can be dissolved in water, and natural polymers such as animalbased, plant-based, polysaccharide-based, and the like, cellulose derivatives, synthetic polymers, and the like may be used. In terms of environmental, safety, and hygienic problems, polymers having excellent safety even when directly contact a human body are preferable, and for example, dextrin-based compounds, cellulose-based compounds, polyvinylalcohol-based compounds, or polyethyleneglycol-based compounds, and the like may be used.

And, as the hydrophilic polymer, those having HLB of 8 or more, or 9 or more, or 10 or more, or 12 or more, or 13 or more, and 20 or less, or 19 or less, or 18 or less may be used. When the HLB is in the above ranges, deterioration of wetting by hydrophobic material can be compensated, and thus, improvement in rewet and wetting properties can be easily achieved.

And, as the hydrophilic polymer, although not limited hereto, those having weight average molecular weight (Mw) of about 600 to about 20,000 g/mol may be used.

The hydrophilic polymer may be mixed in the amount of about 0.001 parts by weight or more, or about 0.005 parts by weight or more, or about 0.01 parts by weight or more, or about 0.02 parts by weight or more, and about 0.5 parts by weight or less, or about 0.3 parts by weight or less, or about 0.1 parts by weight or less, based on 100 parts by weight of the base resin. If the content of the hydrophilic polymer is too small, wetting may not be improved, and if it is included in an excessive amount, it may have a bad influence on rewet property, and thus, the above content ranges may be preferable.

And, according to one embodiment of the present invention, the hydrophobic material and hydrophilic polymer may be used at a weight ratio of about 1:0.1 to about 1:10, or about 1:0.1 to about 1:5, or about 1:0.5 to about 1:2. If the weight ratio is less than 1:0.1, improvement in wetting by hydrophilic polymer may be insignificant, and if it is greater than 1:10, the relative amount of hydrophilic polymer is too large, and thus, the effect of improvement in rewet property may be decreased, and thus, the above weight ratio ranges may be preferable.

A method of mixing the hydrophobic material and hydrophilic polymer is not specifically limited as long as it can uniformly mix them with the base resin.

For example, the hydrophobic material may be dry mixed before a surface crosslinking solution comprising an epoxy-based surface crosslinking agent is mixed with the base resin, or it may be dispersed in the surface crosslinking solution together with a surface crosslinking agent and mixed with the base resin. Alternatively, separately from the surface crosslinking solution, the hydrophobic material may be heated above the melting point and mixed in a solution state.

And, the hydrophilic polymer may be mixed separately before mixing a surface crosslinking solution comprising a surface crosslinking agent with the base resin, or may be mixed by dissolving it in the surface crosslinking solution and mixing with the base resin together with a surface crosslinking agent.

When adding the surface crosslinking agent, it may be added in the form of a surface crosslinking solution by additionally mixing water together. When water is added, the surface crosslinking agent may be uniformly dispersed in the polymer. Here, it is preferable that the content of water added is about 1 to about 10 parts by weight, based on 100 parts by weight of the polymer, so as to induce uniform dispersion of the surface crosslinking agent, preventing the agglomeration of polymer powders, and optimizing the surface penetration depth of the surface crosslinking agent.

And, the surface crosslinking agent is not limited in terms of its construction as long as it can react with the functional group of the polymer Preferably, in order to improve the properties of produced superabsorbent polymer, as the surface crosslinking agent, one or more selected from the group consisting of polyhydric alcohol compounds; epoxy compounds; polyamine compounds; haloepoxy compounds; the condensation products of haloepoxy compounds; oxazoline compounds; mono-, di- or polyoxazolidinone compounds; cyclic urea compounds; multivalent metal salts; and alkylene carbonate compounds may be used.

Specifically, as the polyhydric alcohol compound, one or more selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol may be used.

And, as the epoxy compound, one or more selected from the group consisting of ethylene glycol diglycidyl ether and glycidol, and the like may be used, and as the polyamine compound, one or more selected from the group consisting of ethylenediamine, diethylene triamine, triethylenetetramine, tetraethylenepentamine, pentaethylenehexamine, polyethyleneimine, and polyamide polyamine may be used.

And, as the haloepoxy compound, epichlorohydrin, epibromohydrin, and α-methylepichlorohydrin may be used. And, as the mono-, di- or polyoxazolidinone compounds, 2-oxazolidinone, and the like may be used.

And, as the alkylene carbonate compound, ethylene carbonate, and the like may be used. These compounds may be used alone or in combinations. Meanwhile, in order to increase the efficiency of the surface crosslinking process, one or more kinds of polyhydric alcohol compounds having a carbon number of 2 to 10 may be included in the surface crosslinking agent.

The content of the surface crosslinking agent added may be appropriately selected according to the kinds of the surface crosslinking agent or reaction conditions, but it may be used in the amount of about 0.001 to about 5 parts by weight, preferably about 0.01 to about 3 parts by weight, more preferably about 0.05 to about 2 parts by weight, based on 100 parts by weight of the base resin.

If the content of the surface crosslinking agent is too small, a surface crosslinking reaction may hardly occur, and if is exceeds 5 parts by weight, based on 100 parts by weight of the polymer, due to the progression of excessive surface crosslinking reaction, absorption power and properties may be deteriorated.

Meanwhile, in addition to the above explained surface crosslinking agent, multivalent metal salts, for example, one or more selected from the group consisting of aluminum salts, more specifically, sulfates, potassium salts, ammonium salts, sodium salts and hydrochloride may be further included.

By additionally using such a multivalent metal salt, the permeability of the superabsorbent polymer prepared by the method of one embodiment can be further improved. Such a multivalent metal salt may be added to the surface crosslinking solution together with the surface crosslinking agent, and it may be used in the amount of about 0.01 to 4 parts by weight, based on 100 parts by weight of the base resin.

Next, the mixture of base resin, a surface crosslinking agent, hydrophobic material, and hydrophilic polymer is heated to increase the temperature, thereby conducting a surface modification step of the base resin (step 3).

The surface modification step may be conducted by heating at a temperature of about 90 to about 190° C., preferably about 100 to about 180° C. for about 10 to about 90 minutes, preferably about 20 to about 70 minutes. If the crosslinking reaction temperature is less than 90° C. or the reaction time is too short, a surface crosslinking reaction may not properly occur, and thus, permeability may decrease, and if the temperature is greater than 190° C. or the reaction time is too long, centrifuge retention capacity may be deteriorated.

A temperature rise means for the surface modification reaction is not specifically limited. A heating medium may be supplied, or a heat source may be directly supplied to heat. Here, the kinds of the heating medium that can be used may include temperature-increased fluid such as steam, hot air, hot oil, etc., but are not limited thereto, and the temperature of the heating medium supplied may be appropriately selected considering the means of the heating medium, temperature rise speed and a temperature to be increased. Meanwhile, the heat source directly supplied may include electric heating, gas heating, etc., but is not limited thereto.

By the surface modification step, on the surface of the base resin, a surface crosslink structure that is formed by the reaction of the surface crosslinking agent and the functional group of the base resin, may be formed, and a surface modification layer in which the above explained hydrophobic material and hydrophilic polymer are uniformly distributed in the surface crosslink structure, may be formed.

Thus, the superabsorbent polymer prepared by the preparation method of the present invention, due to such a surface modification layer, may have improved rewet property, permeability and wettability without deteriorating the properties such as centrifuge retention capacity and absorption under pressure, and the like.

Thus, according to another embodiment of the present invention, superabsorbent polymer is provided, which comprises:

base resin comprising crosslinked polymer in which acrylic acid-based monomers having acid groups, of which at least a part are neutralized, are crosslinked; and a surface modification layer formed on the surface of the base resin particles, in which the crosslinked polymer is additionally crosslinked by a surface crosslinking agent, wherein the surface modification layer comprises hydrophobic material having HLB of 0 or more and 6 or less, and hydrophilic polymer, and permeability (unit: seconds) measured according to the following Equation 1 is 30 seconds or less:

Permeability (sec)=$T1-B$     [Equation 1]

in the Equation 1, $T1$ is a time taken until the height of a liquid level decreases from 40 ml to 20 ml, after putting 0.2±0.0005 g of a sieved (30#~50#) superabsorbent polymer sample in a chromatography column and adding brine to the volume of 50 ml, and then, leaving it for 30 minutes; and B is a time taken until the height of a liquid level decreases from 40 ml to 20 ml in a chromatography column filled with brine.

The permeability was measured according to the method described in U.S. Pat. No. 9,656,242 B2.

A device for measuring permeability was a chromatography column that has an inner diameter of 20 mm, and is equipped with a glass filter on the bottom. While a piston was put in the chromatography column, lines were marked at the liquid levels corresponding to the liquid amounts 20 ml and 40 ml. Thereafter, between the glass filter on the bottom of the chromatography column and a cock, water was inversely introduced so as not to generate bubbles, and filled up to about 10 ml, followed by washing with brine twice to three times, and filling with 0.9% brine up to 40 ml or more. A piston was put in the chromatography column, the lower valve was opened, and a time (B) taken until the liquid level decreased from the marked line of 40 ml to the marked line of 20 ml was recorded.

In the chromatography column, 10 ml of brine was left, 0.2±0.0005 g of a sieved (30#~50#) superabsorbent polymer sample was put, and brine was added to the volume of 50 ml, and then, it was allowed to stand for 30 minutes. Thereafter, a piston with a weight (0.3 psi=106.26 g) was put in the chromatography column, and allowed to stand for 1 minute, and then, the lower valve of the chromatography column was opened, and a time ($T1$) taken until the liquid level decreased from the marked line of 40 ml to the marked line of 20 ml was recorded, thus calculating a time of $T1-B$ (unit: second).

The permeability measured according to the Equation 1 may be 30 seconds or less, or 28 seconds or less, or 25 seconds or less, or 20 seconds or less, or 18 seconds or less. The permeability is more excellent as the value is smaller, and thus, the lower limit is theoretically 0 second, but for example, it may be about 5 seconds or more, or about 10 seconds or more, or about 12 seconds or more.

Specific preparation method and properties of the superabsorbent polymer are as explained above.

The superabsorbent polymer may have centrifuge retention capacity (CRC) measured according to EDANA method WSP 241.3, in the range of about 22 g/g or more, or about 25 g/g or more, or about 27 g/g or more, and about 40 g/g or less, or about 38 g/g or less, or about 35 g/g or less.

And, the superabsorbent polymer may have absorption under pressure (AUP) of 0.3 psi, measured according to EDANA method WSP 242.3, in the range of about 20 g/g or more, or about 22 g/g or more, or about 25 g/g or more, and about 35 g/g or less, or about 33 g/g or less, or about 32 g/g or less.

And, the superabsorbent polymer may have a vortex time of 35 seconds or less, or 30 seconds or less, or about 28 seconds or less. The vortex time is more excellent as it is smaller, and thus, the lower limit of the vortex time is theoretically 0 second, but for example, it may be about 5 seconds or more, or about 10 seconds or more, or about 12 seconds or more.

The vortex time means a time (unit: second) taken until liquid vortex disappears by rapid absorption, when superabsorbent polymer is added to a saline solution and stirred, and it is considered that as the time is shorter, superabsorbent polymer has more rapid initial absorption speed.

As explained, the superabsorbent polymer may exhibit excellent permeability, and simultaneously, exhibit more improved rewet property.

More specifically, the rewet property (tap water short-term rewet under no pressure) may be 2.0 g or less, 1.5 g or less, or 1.2 g or less, said rewet property being defined by the weight of water exuding from superabsorbent polymer to a filter paper, after 1 g of the superabsorbent polymer is soaked in 100 g of tap water to swell for 10 minutes, and then, the swollen superabsorbent polymer is left on the filter paper for 1 hour from the first time when it is soaked in the tap water. As the weight of water is smaller, the rewet property is more excellent, and thus, the lower limit is theoretically 0 g, but for example, it may be 0.1 g or more, or 0.3 g or more, or 0.5 g or more.

And, the rewet property (tap water rewet under pressure) may be 1.5 g or less, or 1.2 g or less, or 1.1 g or less, or 1.0 g or less, said rewet property being defined by the weight of water exuding from superabsorbent polymer to a filter paper, after 4 g of the superabsorbent polymer is soaked in 200 g of tap water to swell for 6 hours, and then, the swollen superabsorbent polymer is left on the filter paper for 1 minute under pressure of 0.75 psi. As the weight of water is smaller, the rewet property is more excellent, and thus, the lower limit is theoretically 0 g, but for example, it may be 0.1 g or more, or 0.3 g or more, or 0.5 g or more.

And, the superabsorbent polymer may have rewet property (brine rewet under pressure) of 5.0 g or less, or 4.0 g or less, or 3.0 g or less, or 2.0 g or less, said rewet property being defined by the weight of brine exuding from superabsorbent polymer to a filter paper, after 4 g of the superabsorbent polymer is soaked in 100 g of brine to swell for 2 hours, and then, the swollen superabsorbent polymer is left on the filter paper for 1 minute under pressure of 0.75 psi. As the weight of brine is smaller, the rewet property is more excellent, and thus, the lower limit is theoretically 0 g, but for example, it may be 0.1 g or more, or 0.3 g or more, or 0.5 g or more.

In the rewet property evaluation, the tap water used may have electric conductivity of 170 to 180 µS/cm. Since the electric conductivity of tap water significantly influences the properties measured, there is a need to measure the properties such as rewet property using tap water having electric conductivity of an equivalent level.

As explained above, the superabsorbent polymer of the present invention has excellent absorption power, and even if it absorbs a large quantity of urine, rewet and urine leakage may be inhibited.

The present invention will be explained in more detail in the following examples. However, these examples are presented only as the illustrations of the present invention, and the scope of the present invention is not limited thereby.

EXAMPLE

Preparation of Superabsorbent Polymer

Example 1

100 g of acrylic acid, 0.001 g of polyethyleneglycol diacrylate (PEGDA, Mw=523) and 0.32 g of ethyleneglycol diglycidyl ether as crosslinking agents, 0.08 g of a thermal initiator of sodium persulate (SPS), 0.015 g of surfactant of sodium dodecylsulfate, 128 g of 31.5% caustic soda (NaOH), and 63.5 g of water were mixed to prepare an aqueous monomer composition. The aqueous monomer composition was subjected to a thermal polymerization to obtain a polymerized sheet. The polymerized sheet was taken out and cut to a size of 3 cm×3 cm, and then, chopped using a meat chopper to prepare crumb. The crumb was dried in an oven capable of transferring air volume up and down. Hot air of 185° C. was flowed from the lower part to the upper part for 15 minutes, and flowed from the upper part to the lower part for 15 minutes, so that the crumb was uniformly dried, and the moisture content of the dried product became 2% or less. After drying, it was ground with a grinder, and then, sieved for 10 minutes with an amplitude of 1.5 mm (combination of sieving mesh: #20/#30/#50/#100), and each sieved part (10%/65%/22%/3%) was collected to obtain base resin powders having a particle diameter of about 150 µm to 850 µm.

Thereafter, a surface crosslinking solution (6.2 parts by weight of water, 6.2 parts by weight of methanol, 0.03 parts by weight of ethyleneglycol diglycidyl ether, 0.025 parts by weight of glycerol monostearate, 0.025 parts by weight of polyethylene glycol 6000, 0.05 parts by weight of $Na_2S_2O_5$, 0.2 parts by weight of aluminum sulfate 18 hydrate (Al—S), and 0.1 parts by weight of aluminum oxide ALu130) was uniformly mixed with 100 parts by weight of the base resin prepared above, and then, a surface crosslinking reaction was progressed at 140° C. for 30 minutes. After the surface treatment was finished, superabsorbent polymer having an average particle diameter of 850 µm or less was obtained using a sieve.

Example 2

Superabsorbent polymer was obtained by the same method as Example 1, except that the content of glycerol monostearate included in the surface crosslinking solution of Example 1 was changed to 0.075 parts by weight, and the content of polyethyleneglycol was changed to 0.075 parts by weight.

Example 3

Superabsorbent polymer was obtained by the same method as Example 1, except that the content of glycerol monostearate included in the surface crosslinking solution of Example 1 was changed to 0.15 parts by weight, and the content of polyethyleneglycol was changed to 0.075 parts by weight.

Example 4

Superabsorbent polymer was obtained by the same method as Example 1, except that the content of glycerol monostearate included in the surface crosslinking solution of Example 1 was changed to 0.05 parts by weight, and the content of polyethyleneglycol was changed to 0.05 parts by weight.

Comparative Example 1

Superabsorbent polymer was obtained by the same method as Example 1, except that glycerol monostearate and polyethyleneglycol were not included in the surface crosslinking solution of Example 1.

Comparative Example 2

Superabsorbent polymer was obtained by the same method as Example 1, except that polyethyleneglycol was not included in the surface crosslinking solution of Example 1.

Comparative Example 3

Superabsorbent polymer was obtained by the same method as Example 1, except that the content of glycerol monostearate in the surface crosslinking solution of Example 1 was changed to 0.015 parts by weight, and polyethyleneglycol was not included.

Reference Example 1

Superabsorbent polymer was obtained by the same method as Example 1, except that the content of glycerol monostearate included in the surface crosslinking solution of Example 1 was changed to 0.01 parts by weight.

Experimental Example

For the superabsorbent polymer prepared in Examples and Comparative Examples, the properties were evaluated as follows.

Unless otherwise indicated, all the property evaluations were progressed at constant temperature constant humidity (23±1° C., relative humidity 50±10%), and a saline solution or brine means an aqueous solution of 0.9 wt % sodium chloride (NaCl).

And, in the following rewet property evaluation, as the tap water, tap water having electric conductivity of 170 to 180 μS/cm, when measured using Orion Star A222 (Thermo Scientific), was used.

(1) Centrifuge Retention Capacity (CRC)

Centrifuge retention capacity by absorption rate under no load was measured according to EDANA WSP 241.3.

Specifically, $W_0$ (g) (about 0.2 g) of superabsorbent polymer was uniformly put in an envelope made of non-woven fabric and sealed, and then, soaked in a saline solution (0.9 wt %) at room temperature. After 30 minutes, it was drained under 250 G using a centrifuge for 3 minutes, and the weight $W_2$ (g) of the envelope was measured. And, the same operation was conducted without using polymer, and then, the weight $W_1$ (g) at that time was measured. Using each obtained weight, CRC (g/g) was calculated according to the following Mathematical Formula.

$$\text{CRC (g/g)} = \{[W_2(g) - W_1(g)]/W_0(g)\} - 1 \quad \text{[Mathematical Formula 1]}$$

(2) Absorption Under Pressure (AUP)

Absorption under 0.3 psi pressure of each polymer was measured according to EDANA method WSP 242.3.

Specifically, on the bottom of a plastic cylinder having an inner diameter of 60 mm, a 400 mesh wire netting made of stainless was installed. Under room temperature and 50% humidity conditions, $W_0$ (g) (0.90 g) of superabsorbent polymer was uniformly sprayed on the wire netting, and a piston having an outer diameter slightly smaller than 60 mm and capable of further giving 0.3 psi load was installed thereon so that there was no gap with the inner wall of the cylinder and the up and down movement was not hindered. At this time, the weight $W_3$ (g) of the device was measured.

Inside a petri dish having a diameter of 150 mm, a glass filter having a diameter of 90 mm and a thickness of 5 mm was laid, and a saline solution consisting of 0.9 wt % sodium chloride was put to the same level with the upper side of the glass filter. One piece of a filter paper was laid thereon. On the filter paper, the measuring device was laid, and the liquid was absorbed under pressure for 1 hour. After 1 hour, the measuring device was lifted, and the weight $W_4$ (g) was measured.

Using each obtained weight, absorption under pressure (g/g) was calculated according to the following Mathematical Formula.

$$\text{AUP (g/g)} = [W_4(g) - W_3(g)]/W_0(g) \quad \text{[Mathematical Formula 2]}$$

(3) Permeability

Permeability was measured according to the method described in U.S. Pat. No. 9,656,242 B2.

A device for measuring permeability was a chromatography column that has an inner diameter of 20 mm, and is equipped with a glass filter on the bottom. While a piston was put in the chromatography column, lines were marked at the liquid levels corresponding to the liquid amounts 20 ml and 40 ml. Thereafter, between the glass filter on the bottom of the chromatography column and a cock, water was inversely introduced so as not to generate bubbles, and filled up to about 10 ml, followed by washing with brine twice to three times, and filling with 0.9% brine up to 40 ml or more. A piston was put in the chromatography column, the lower valve was opened, and a time (B) taken until the liquid level decreased from the marked line of 40 ml to the marked line of 20 ml was recorded.

In the chromatography column, 10 ml of brine was left, 0.2±0.0005 g of a sieved (30#~50#) superabsorbent polymer sample was put, and brine was added to the volume of 50 ml, and then, it was allowed to stand for 30 minutes. Thereafter, a piston with weight (0.3 psi=106.26 g) was put in the chromatography column, and allowed to stand for 1 minute, and then, the lower valve of the chromatography column was opened, and a time (T1) taken until the liquid level decreased from the marked line of 40 ml to the marked line of 20 ml was recorded, thus calculating a time of T1−B (unit: second).

(4) Wetting Time

A wetting time was measured in the unit of seconds, according to the method described in International Patent Publication No. 1987-003208 for measuring a vortex time.

Specifically, in 50 mL of a saline solution of 23° C. to 24° C., 2 g of superabsorbent polymer was introduced, and while stirring at 600 rpm with a magnetic bar (diameter 8 mm, length 30 mm), a time taken until non-wetted superabsorbent polymer was observed at the upper part of the liquid was measured. It can be evaluated that wetting property is inferior as the time is longer.

(5) Tap Water Short-Term Rewet Under No Pressure (Rewet, 1 hr)

① In a cup (upper part diameter 7 cm, lower part diameter 5 cm, height 8 cm, volume 192 ml), 1 g of superabsorbent polymer was put, and 100 g of tap water was poured to swell the superabsorbent polymer.

② 10 minutes after pouring tap water, the cup containing swollen superabsorbent polymer was turned over on 5 pieces of filter papers (manufacturing company: whatman, catalog No. 1004-110, pore size 20-25 μm, diameter 11 cm).

③ 1 hour after pouring tap water, the cup and the superabsorbent polymer were removed, and the amount of tap water (unit: g) wetted on the filter papers was measured.

(6) Tap Water Rewet Under Pressure (Rewet, 6 Hrs)

① In a petri dish having a diameter of 13 cm, 4 g of superabsorbent polymer was uniformly sprayed and uniformly distributed, and 200 g of tap water was poured to swell the superabsorbent polymer for 6 hours.

② The superabsorbent polymer swollen for 6 hours was pressurized for 1 minute with a weight of 5 kg and a diameter of 11 cm (0.75 psi) on 20 pieces of filter papers (manufacturing company: whatman, catalog No. 1004-110, pore size 20-25 μm, diameter 11 cm).

③ After pressurizing for 1 minute, the amount of tap water (unit: g) wetted on the filter papers was measured.

(7) Brine Rewet Under Pressure (Rewet, 2 Hrs)

① In a petri dish having a diameter of 13 cm, 4 g of superabsorbent polymer was uniformly sprayed and uniformly distributed, and 100 g of brine was poured to swell the superabsorbent polymer for 2 hours.

② The superabsorbent polymer swollen for 2 hours was pressurized for 1 minute with a weight of 5 kg and a diameter of 11 cm (0.75 psi) on 20 pieces of filter papers (manufacturing company: whatman, catalog No. 1004-110, pore size 20-25 μm, diameter 11 cm).

(3) After pressurizing for 1 minute, the amount of brine (unit: g) wetted on the filter papers was measured.

(8) Vortex Time

A vortex time was measured in the unit of seconds according to the method described in International Patent Publication No. 1987-003208.

Specifically, into 50 mL of a saline solution of 23° C. to 24° C., 2 g of superabsorbent polymer was introduced, and while stirring with a magnetic bar (diameter 8 mm, length 30 mm) at 600 rpm, a time taken until vortex disappeared was measured in the unit of seconds, thus calculating the vortex time.

The property values of Examples and Comparative Examples were described in the following Table 1.

TABLE 1

|  | Example 1 | Example 2 | Example 3 | Example 4 | Comparative Example 1 | Comparative Example 2 | Comparative Example 3 | Reference Example 1 |
| --- | --- | --- | --- | --- | --- | --- | --- | --- |
| CRC (g/g) | 31 | 31 | 29 | 31 | 30 | 30 | 30 | 30 |
| 0.3 psi AUP (g/g) | 28 | 28 | 27 | 28 | 28 | 28 | 28 | 28 |
| Wetting time (seconds) | 0 | 5 | 5 | 3 | 0 | 32 | 30 | 5 |
| Vortex time (seconds) | 27 | 27 | 30 | 27 | 29 | 32 | 30 | 29 |
| Tap water short-term rewet under no pressure (g) | 1.3 | 0.8 | 0.6 | 1.0 | 2.2 | 1.3 | 2.1 | 2.1 |
| Tap water rewet under pressure (g) | 0.9 | 0.7 | 0.4 | 0.6 | 2.0 | 0.9 | 2.0 | 2.0 |
| Brine rewet under pressure (g) | 2.0 | 1.2 | 1.0 | 0.8 | 5.7 | 2.2 | 2.0 | 5.5 |
| permeability (seconds) | 18 | 15 | 15 | 16 | 22 | 17 | 21 | 20 |

Referring to Table 1, it was confirmed that in Examples 1 to 4 of the present invention wherein both hydrophobic material and hydrophilic polymer were used, excellent wettability and permeability were exhibited, and tap water rewet amounts under no pressure and under pressure and brine rewet amount under pressure were very small, thus exhibiting improved rewet property.

To the contrary, in Comparative Example 1, both rewet property and permeability were inferior to Examples, and in Comparative Examples 2 and 3 wherein hydrophilic polymer was not included, although rewet properties were similar to Examples, wetting time and vortex time were inferior.

In Reference Example 1 wherein hydrophobic material was included in the content of 0.01 parts by weight, rewet property and permeability were better than Comparative Example 1, but inferior to Examples 1 to 4.

What is claimed is:

1. A method for preparing superabsorbent polymer comprising:
   preparing a base resin in which acrylic acid-based monomers having acid groups, of which at least a part are neutralized, and an internal crosslinking agent are crosslinked;
   mixing a hydrophobic material having a HLB of 0 or more and 6 or less, a hydrophilic polymer, and a surface crosslinking agent with the base resin to obtain a mixture; and
   increasing a temperature of the mixture to conduct surface modification of the base resin,
   wherein the hydrophilic polymer includes one or more of dextrine-based compounds, cellulose-based compounds, polyvinylalcohol-based compounds, or polyethyleneglycol-based compounds.

2. The method for preparing superabsorbent polymer according to claim 1, wherein during the mixing, the hydrophobic material is dry mixed with the base resin, and then, the surface crosslinking agent and the hydrophilic polymer are mixed.

3. The method for preparing superabsorbent polymer according to claim 2, wherein the surface crosslinking agent and the hydrophilic polymer are dissolved in water and mixed in a state of a surface crosslinking solution.

4. The method for preparing superabsorbent polymer according to claim 1, wherein the hydrophobic material has a melting point below the increased temperature.

5. The method for preparing superabsorbent polymer according to claim 1, wherein the hydrophobic material includes one or more of glyceryl stearate, glycol stearate, magnesium stearate, glyceryl laurate, sorbitan stearate, sorbitan trioleate, or PEG-4 dilaurate.

6. The method for preparing superabsorbent polymer according to claim 1, wherein the hydrophilic polymer has the HLB of 8 or more.

7. The method for preparing superabsorbent polymer according to claim 1, wherein the hydrophobic material is glyceryl stearate, and the hydrophilic polymer is polyethylene glycol.

8. The method for preparing superabsorbent polymer according to claim 1, wherein the hydrophobic material is mixed in a content of 0.02 to 0.5 parts by weight, based on 100 parts by weight of the base resin.

9. The method for preparing superabsorbent polymer according to claim 1, wherein the hydrophilic polymer is mixed in a content of 0.001 to 0.5 parts by weight, based on 100 parts by weight of the base resin.

10. The method for preparing superabsorbent polymer according to claim 1, wherein the temperature is increased to 90 to 190° C.

11. The method for preparing superabsorbent polymer according to claim 1, wherein the preparing the base resin comprises:
    polymerizing a monomer composition comprising acrylic acid-based monomers having acid groups, of which at least a part are neutralized, an internal crosslinking agent, and a polymerization initiator to form a hydrogel polymer;
    drying the hydrogel polymer;
    grinding the dried polymer; and
    sieving the ground polymer.

12. The method for preparing superabsorbent polymer according to claim 1, wherein the superabsorbent polymer has a permeability (unit: seconds) measured according to the following Equation 1, of 30 seconds or less:

$$\text{Permeability(sec)} = T1 - B \quad \text{[Equation 1]}$$

wherein in the Equation 1,

T1 is a time taken until the height of a liquid level decreases from 40 ml to 20 ml, after putting 0.2±0.0005 g of a sieved (30#~50#) superabsorbent polymer sample in a chromatography column and adding brine to the volume of 50 ml, and then, leaving it for 30 minutes; and B is a time taken until the height of a liquid level decreases from 40 ml to 20 ml in a chromatography column filled with brine.

13. A superabsorbent polymer comprising:

a base resin comprising a crosslinked polymer in which acrylic acid-based monomers having acid groups, of which at least a part are neutralized, are crosslinked; and a surface modification layer formed on a surface of base resin particles, in which the crosslinked polymer is additionally crosslinked by a surface crosslinking agent, wherein the surface modification layer comprises a hydrophobic material having a HLB of 0 or more and 6 or less, and a hydrophilic polymer, and a permeability (unit: seconds) measured according to the following Equation 1 is 30 seconds or less:

$$\text{Permeability(sec)} = T1 - B \quad \text{[Equation 1]}$$

wherein in the Equation 1,

T1 is a time taken until the height of a liquid level decreases from 40 ml to 20 ml, after putting 0.2±0.0005 g of a sieved (30#~50#) superabsorbent polymer sample in a chromatography column and adding brine to the volume of 50 ml, and then, leaving it for 30 minutes; and B is a time taken until the height of a liquid level decreases from 40 ml to 20 ml in a chromatography column filled with brine.

14. The superabsorbent polymer according to claim 13, wherein the hydrophobic material includes one or more of glyceryl stearate, glycol stearate, magnesium stearate, glyceryl laurate, sorbitan stearate, sorbitan trioleate, or PEG-4 dilaurate.

15. The superabsorbent polymer according to claim 13, wherein the superabsorbent polymer has a rewet property (tap water short-term rewet under no pressure) of 2.0 g or less, said rewet property being defined by a weight of water exuding from the superabsorbent polymer to a filter paper, after 1 g of the superabsorbent polymer is soaked in 100 g of tap water to swell for 10 minutes to produce a swollen superabsorbent polymer, and then, the swollen superabsorbent polymer is left on the filter paper for 1 hour from a first time point when it is soaked in the tap water.

16. The superabsorbent polymer according to claim 13, wherein the superabsorbent polymer has a rewet property (tap water rewet under pressure) of 1.5 g or less, said rewet property being defined by a weight of water exuding from the superabsorbent polymer to a filter paper, after 4 g of the superabsorbent polymer is soaked in 200 g of tap water to swell for 6 hours to produce a swollen superabsorbent polymer, and then, the swollen superabsorbent polymer is left on the filter paper for 1 minute under pressure of 0.75 psi.

17. The superabsorbent polymer according to claim 13, wherein the superabsorbent polymer has a rewet property (brine rewet under pressure) of 5.0 g or less, said rewet property being defined by a weight of brine exuding from the superabsorbent polymer to a filter paper, after 4 g of the superabsorbent polymer is soaked in 100 g of brine to swell for 2 hours to produce a swollen superabsorbent polymer, and then, the swollen superabsorbent polymer is left on the filter paper for 1 minute under pressure of 0.75 psi.

18. The superabsorbent polymer according to claim 13, wherein the hydrophobic material is included in a content of 0.02 to 0.5 parts by weight, based on 100 parts by weight of the base resin.

* * * * *